United States Patent
Chaudhri et al.

(10) Patent No.: US 11,722,013 B1
(45) Date of Patent: Aug. 8, 2023

(54) PORTABLE BATTERY PACK FOR WIRELESSLY CHARGING AND COMMUNICATING WITH PORTABLE ELECTRONIC DEVICE THROUGH CLOTHING

(71) Applicant: Humane, Inc., San Francisco, CA (US)

(72) Inventors: Imran A. Chaudhri, San Francisco, CA (US); Bethany Bongiorno, San Francisco, CA (US); Sara Glick, Oakland, CA (US); James Joseph Blanc, San Mateo, CA (US); Miguel Christophy, San Francisco, CA (US); Patrick Gates, San Francisco, CA (US); Brian Huppi, San Francisco, CA (US)

(73) Assignee: Humane, Inc., San Francisco, CA (US)

( * ) Notice: Subject to any disclaimer, the term of this patent is extended or adjusted under 35 U.S.C. 154(b) by 0 days.

(21) Appl. No.: 17/334,632

(22) Filed: May 28, 2021

Related U.S. Application Data

(60) Provisional application No. 63/032,511, filed on May 29, 2020.

(51) Int. Cl.
*H02J 50/80* (2016.01)
*H02J 50/12* (2016.01)
(Continued)

(52) U.S. Cl.
CPC .......... *H02J 50/80* (2016.02); *H02J 7/00034* (2020.01); *H02J 50/12* (2016.02); *H04B 5/0037* (2013.01)

(58) Field of Classification Search
CPC .... H02J 7/00034; H02J 7/00036; H02J 50/12; H02J 50/80; H04B 5/0031; H04B 5/0037
(Continued)

(56) References Cited

U.S. PATENT DOCUMENTS 5,703,470 A 12/1997 Baranowski et al.
2010/0001691 A1 1/2010 Li
(Continued)

FOREIGN PATENT DOCUMENTS

AU 2015101232 10/2015
CN 101919139 8/2014
(Continued)

OTHER PUBLICATIONS

International Preliminary Report on Patentability in International Appln. No. PCT/US2020/038207, dated Dec. 30, 2021, 13 pages.
(Continued)

*Primary Examiner* — William Hernandez
(74) *Attorney, Agent, or Firm* — Fish & Richardson P.C.

(57) ABSTRACT

A portable battery pack and portable electronic device communicate by pulsing (turning on/off) their respective battery chargers causing variations in a magnetic field between the battery pack and portable electronic device that can be used to transmit and receive short messages through their respective coils using a magnetic communication protocol. Data or messages can be transferred between portable battery pack and portable electronic device when the portable battery pack and portable electronic device are in a mated configuration. The magnetic communication protocol allows for bi-directional communication of various battery status indicators and other data from the portable battery pack to the portable electronic device and vice-versa. The magnetic communication also allows the portable electronic device to be authenticated by the portable battery pack or vice-versa, such that the absence of any communication between the portable electronic device and portable battery pack renders the portable electronic device fully/partially inoperable.

8 Claims, 6 Drawing Sheets

(51) Int. Cl.
*H04B 5/00* (2006.01)
*H02J 7/00* (2006.01)

(58) Field of Classification Search
USPC .......................................... 307/104; 455/41.1
See application file for complete search history.

(56) References Cited

U.S. PATENT DOCUMENTS

| | | |
|---|---|---|
| 2010/0225429 A1 | 9/2010 | Tsai |
| 2012/0032632 A1* | 2/2012 | Soar .................. H02J 7/0042 |
| | | 320/108 |
| 2013/0249479 A1 | 9/2013 | Partovi |
| 2013/0285618 A1 | 10/2013 | Iijima et al. |
| 2014/0358297 A1 | 12/2014 | Fadell et al. |
| 2016/0056639 A1 | 2/2016 | Mao |
| 2018/0332211 A1 | 11/2018 | Chaudhri et al. |
| 2020/0227946 A1 | 7/2020 | Mao et al. |
| 2021/0111591 A1 | 4/2021 | Chaudhri et al. |

FOREIGN PATENT DOCUMENTS

| | | |
|---|---|---|
| IN | 18521 | 12/2018 |
| JP | 2011-087457 | 4/2011 |
| JP | 2014-007924 | 1/2014 |
| JP | 2014-023298 | 2/2014 |
| JP | 2015-011971 | 1/2015 |
| JP | 2015-061468 | 3/2015 |
| KR | 20170016147 | 2/2017 |
| KR | 20210022496 | 3/2021 |
| WO | WO 2017/038797 | 3/2017 |

OTHER PUBLICATIONS

International Search Report and Written Opinion in International Appln. No. PCT/US2020/038207, dated Sep. 9, 2020, 14 pages.

* cited by examiner

PORTABLE BATTERY PACK FOR WIRELESSLY CHARGING AND COMMUNICATING WITH PORTABLE ELECTRONIC DEVICE THROUGH CLOTHING

CROSS-REFERENCE TO RELATED APPLICATION

This application claims priority to U.S. Provisional Patent Application No. 63/032,511, filed May 29, 2020, the entire contents of which is incorporated herein by reference.

TECHNICAL FIELD

This disclosure relates generally to portable battery packs for portable electronic devices.

BACKGROUND

Rechargeable battery packs are commercially available today to deliver extended runtimes to mobile devices, such as smart phones and tablet computers. An advantage of a battery pack is that it can be easily swapped into or out of a mobile device. The battery packs are recharged using a standard electrical outlet. A conventional battery pack includes battery cells and circuitry for delivering charge to the mobile device and for recharging the battery pack using a standard wall outlet. Conventional battery packs rely on a metal contacts between positive/negative power terminals on the battery pack and corresponding positive/negative power terminals on the mobile device. Although conventional battery packs mate well with mobile phones and tablet computers placed on a surface, conventional battery packs are not convenient to use with wearable devices, such as a body-worn cameras.

SUMMARY

A portable battery pack and portable electronic device communicate by pulsing (turning on and off) their respective battery chargers causing variations in a magnetic field between the battery pack and portable electronic device that can be used to transmit and receive short messages through their respective coils using a magnetic communication protocol. By using a pulse-based, magnetic near-field communication protocol, data or messages can be transferred between portable battery pack and portable electronic device when the portable battery pack and portable electronic device are in a mated configuration. The magnetic communication protocol allows for bi-directional communication of various battery status indicators and other data from the portable battery pack to the portable electronic device and vice-versa.

In an embodiment, a magnetic communication system comprises: a portable battery pack including: a first housing having a first mating surface; a first permanent magnet disposed on the first mating surface for coupling with a second permanent magnet on a portable electronic device; a first battery secured within the first housing; a first printed circuit board (PCB) secured within the first housing, the first PCB including: a first power amplifier coupled to the first battery; a first battery charger coupled to the first battery; a first coil coupled to the first power amplifier; and a first processor coupled to the first battery charger and the first coil, the first processor configured to command the first battery charger to encode a first magnetic field emitted from the first coil with first data, and to decode a second encoded magnetic field received on the first coil that is emitted from the second coil; a portable electronic device including: a second housing having a second mating surface; a second permanent magnet disposed on the second mating surface coupling with the first permanent magnet disposed on the first mating surface of the portable battery pack; a second battery included in the second housing; a second coil included in the second housing and coupled to the second battery; a second PCB included in the second housing, the second PCB including: a second power amplifier coupled to the second battery; a second battery charger coupled to the second battery; a second coil coupled to the second power amplifier; and a second processor coupled to the second battery charger and the second coil, the second processor configured to command the second battery charger to encode a second magnetic field emitted from the second coil with second data, and to decode the first encoded magnetic field received on the second coil that is emitted from the first coil.

Particular embodiments disclosed herein provide one or more of the following advantages. The disclosed portable battery pack uses resonant inductive charging to wirelessly power a portable electronic device through a user's clothing without using any cumbersome power cords. The portable device mates with the portable electronic device using one or more permanent magnets, resulting in a single device rather than two separate devices. The portable battery pack is easily swapped out with another portable battery pack without having to disconnect wires. In an embodiment, the portable battery pack includes a receiver coil to allow the portable battery pack to be wireless charged (e.g., using a charge mat), and also an electrical connector to allow the portable battery pack to be charged using a standard AC wall outlet or transformer ("wall wart"). In an embodiment, a single coil is connected to a switch to allow the coil to be used as a receive coil or a transmit coil depending on whether the portable power pack is operating in a power transfer mode or a charging mode.

In a communication mode, the portable battery pack and portable electronic device communicate bi-directionally by pulsing (turning on and off) their respective battery chargers, causing variations in a magnetic field between the battery pack and portable electronic device is used to transmit and receive short messages through their respective coils using a magnetic communication protocol.

The details of the disclosed embodiments are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Figure 1:
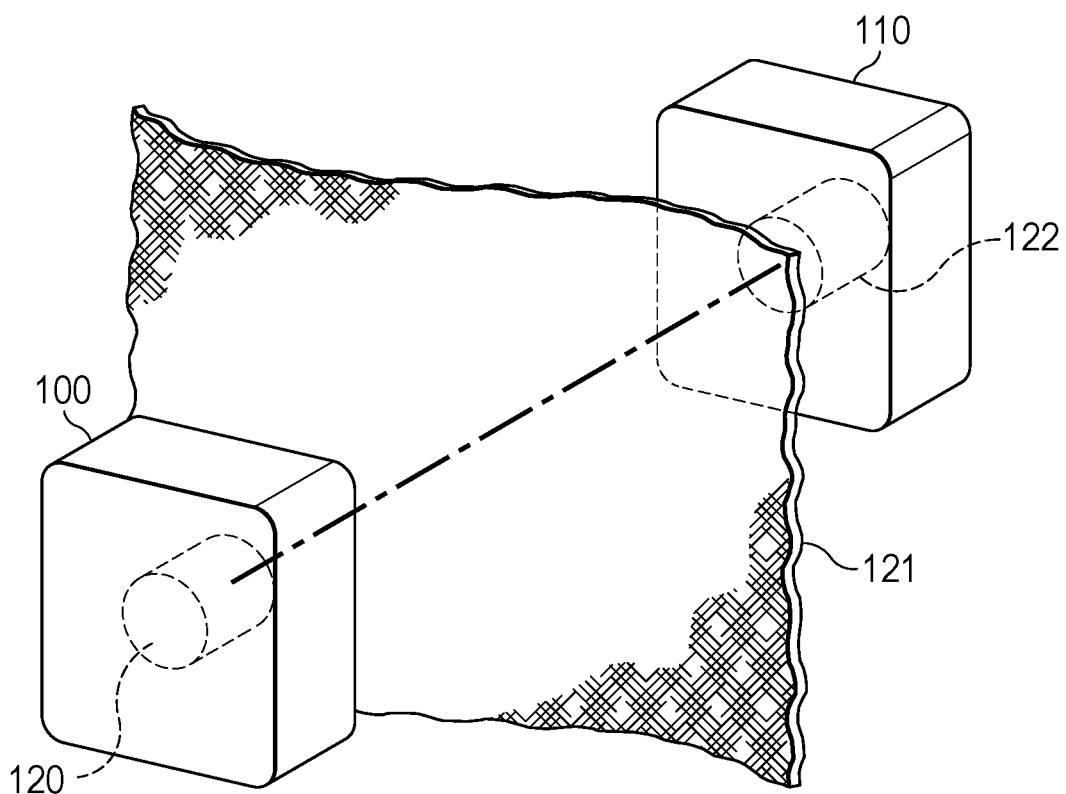
FIG. 1 is a perspective view of a portable battery pack wirelessly powering a portable electronic device through a user's clothing, according to an embodiment.

FIG. 1 is a perspective view of portable battery pack 100 wirelessly powering portable electronic device 110 through user's clothing 121, according to an embodiment. Portable electronic device 110 can be any electronic device or circuit, such as the wearable multimedia device described in U.S. Patent Publication No. 20180332211A1.

In the example shown, battery pack 100 includes a mating surface that has permanent magnet 120 (e.g., N pole) disposed thereon, and portable electronic device 110 has a corresponding mating surface that has permanent magnet 122 (e.g., S pole) disposed thereon. Although two permanent magnets 120, 122 are shown in FIG. 1, any number of permanent magnets having any desired shape or size can be arranged in any desired pattern on the mating surfaces.

Permanent magnets 120, 122 hold portable battery pack 100 and portable electronic device 110 together in a mated configuration with clothing 121 therebetween. In an embodiment, portable battery pack 100 and electronic device 110 have the same mating surface dimensions, such that there is no overhanging portions when in a mated configuration. A user magnetically fastens portable electronic device 110 to their clothing 121 by placing portable battery pack 100 underneath their clothing 121 and placing portable electronic device 110 on top of portable battery pack 100 outside their clothing 121, such that permanent magnets 120, 122 attract each other through clothing 121. In an embodiment, the mating surfaces can include one or more guide structures for facilitating a desired alignment of portable electronic device 110 and portable battery pack 100 when in a mated configuration. Although the housings are shown as square-shaped, the housings can have any desired shape.

In an embodiment, portable battery pack 100 and/portable electronic device include one or more illumination devices (e.g., LEDS) to provide visual feedback regarding the operational state of portable battery pack 100. For example, an LED of portable battery pack 100 can indicate remaining power or a charging state. In an embodiment, portable battery pack 100 includes a haptic engine (e.g., a linear actuator) that provides haptic feedback indicating successful mating with portable electronic device 110 or when portable battery pack 100 is connected to a power supply. In an embodiment, portable battery pack 100 includes multiple ports (e.g., multiple USB ports) for charging portable battery pack 100 by another device (e.g., a personal computer).

Figure 2:
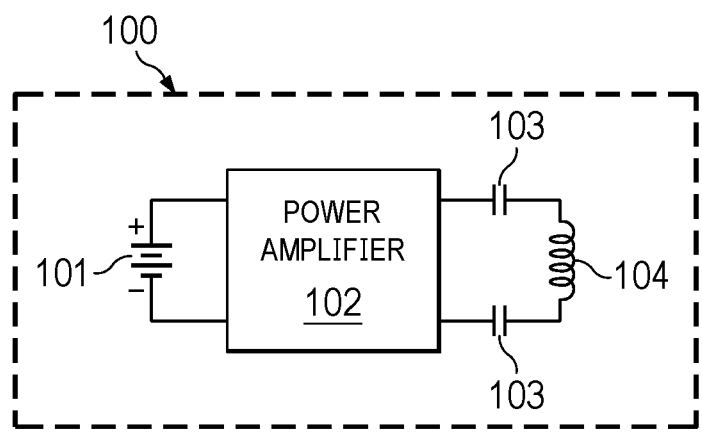
FIG. 2 is a schematic diagram of a portable battery pack with a built-in wireless power transmitter, according to an embodiment.
Figure 9A:
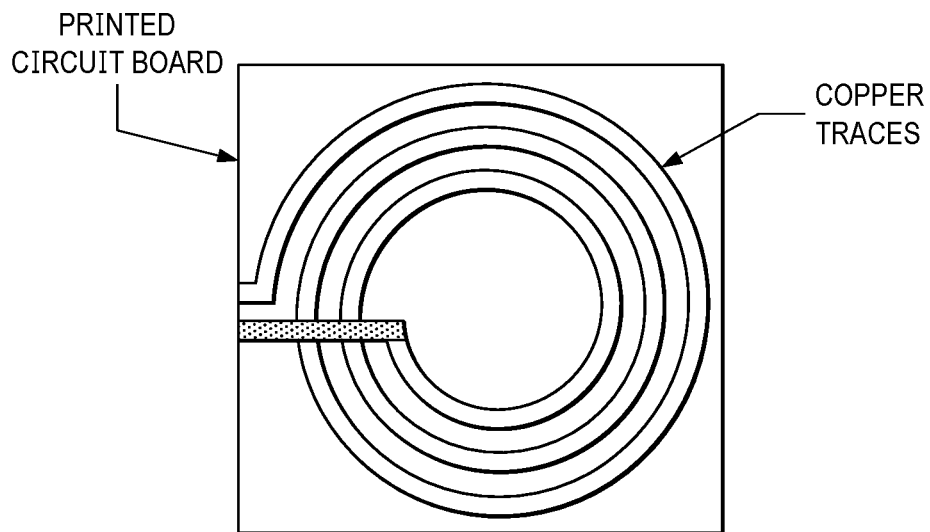
FIG. 9 are top and side views of a planar coil disposed on a PCB, according to an embodiment.
Figure 9B:
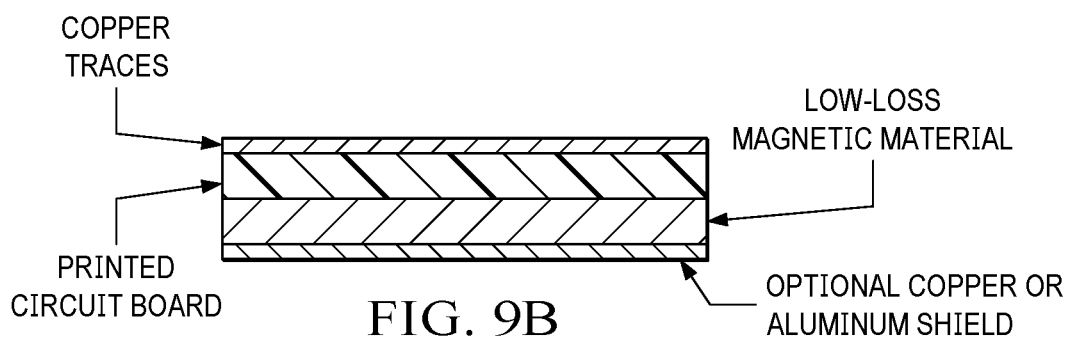

FIG. 2 is a schematic diagram of the portable battery pack 100 with a built-in wireless power transmitter, according to an embodiment. Portable battery pack 100 includes a printed circuit board (PCB) (not shown) for mounting electronic components, such battery cells 101, power amplifier 102, transmitter resonant capacitors 103 and transmitter coil 104. In an embodiment, power amplifier 102 feeds power into transmitter coil 104. Transmitter resonant capacitors 103 and transmitter coil 104 are used to wirelessly power portable electronic device 100 using the principle of resonant inductive coupling. In an embodiment, transmitter coil 104 is a planar copper winding formed as a spiral on a plane surface of the PCB, as shown in FIG. 9. In an alternative embodiment, a single layer solenoid is used for the transmitter coil 104. Other coil shapes or types may be used, such as a wave-wound litz wire with appropriate insulation between strands (e.g., spacers, low permittivity or low loss materials to minimize dielectric losses). In an embodiment, there can be more than one PCB stacked in either portable battery pack 100 or portable electronic device 110 to increase the usable circuit area.

Figure 3:
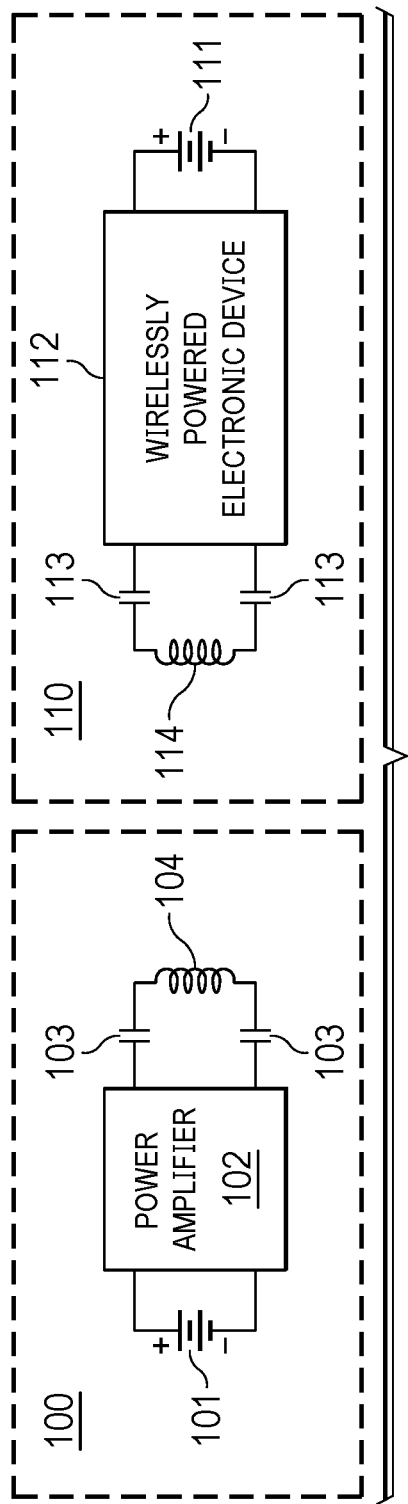
FIG. 3 is a schematic diagram of a portable battery pack with a built-in wireless power transmitter feeding power to a portable electronic device, according to an embodiment.

FIG. 3 is a schematic diagram of a portable battery pack with a built-in wireless power transmitter feeding power to a portable electronic device, according to an embodiment. In a mated configuration, transmitter coil 104 of portable battery pack 100 is excited by power amplifier, causing a quasi-static magnetic field which is coupled to receiver coil 114 of portable electronic device 110 to form a loosely-coupled transformer. Transmitter resonant capacitors 103 and receiver resonant capacitors 113 have capacitive values that allow resonant inductive coupling to improve power transfer. Also shown is an optional portable electronic device battery 111 (e.g., a rechargeable battery) that powers portable electronic device 110 when not receiving power from portable battery pack 100. In an embodiment, the dimensions of transmitter coil 104 and receiver coil 114 are equal or nearly equal, and the separation distance is less than about one fourth of the coil dimension. This allows the power efficiency to exceed 70%.

Figure 4:
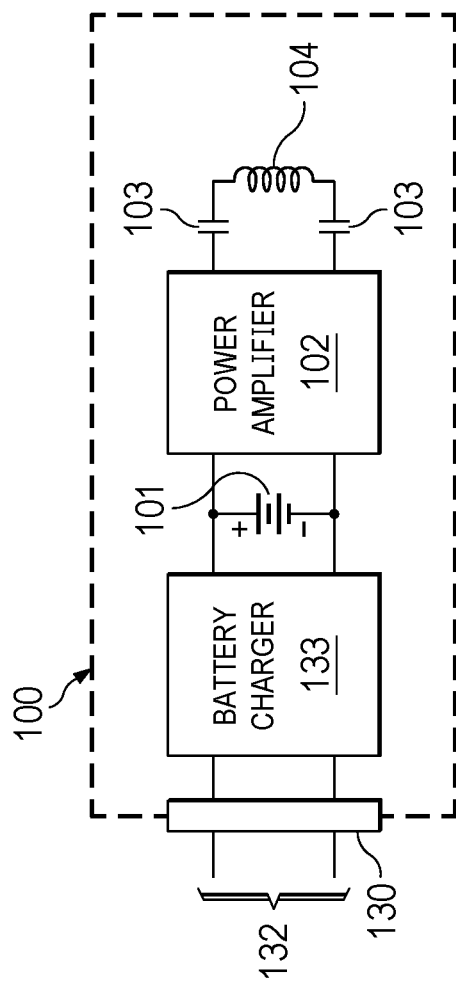
FIG. 4 is a schematic diagram of a portable battery pack with a built-in wireless power transmitter and a connector for charging the portable battery pack, according to an embodiment.

FIG. 4 is a schematic diagram of a portable battery pack 100 with a built-in wireless power transmitter and a connector 130 for charging the portable battery pack 100, according to an embodiment. In this embodiment, connector 130 with metal contacts is coupled to battery charger 133, which is configured to charge battery cells 101 using a standard wall outlet (120V). In an embodiment, battery charger 133 may have a rectifier circuit, temperature or voltage sensing circuits and a microprocessor controller to safely adjust the charging current and voltage, determine the state of charge, and cut off at the end of charge.

Figure 5:
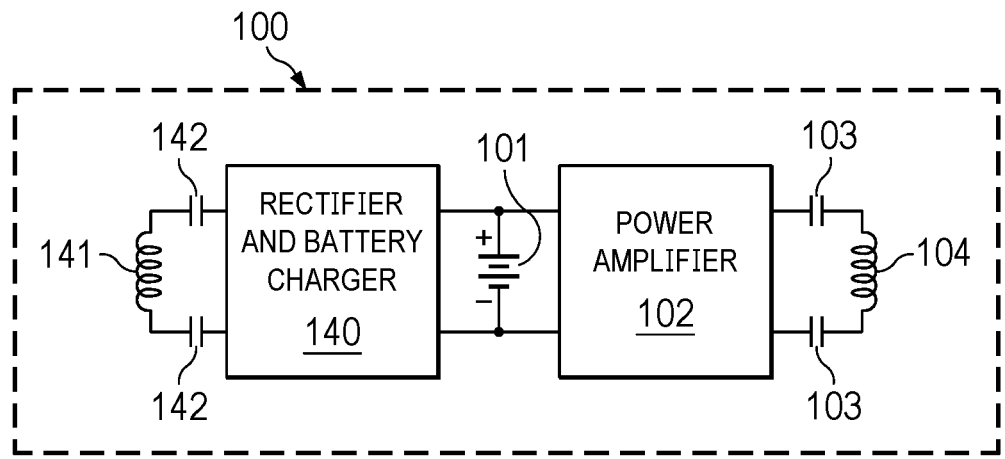
FIG. 5 is a schematic diagram of a portable battery pack with a built-in wireless power transmitter and a second coil for wirelessly charging the portable battery pack, according to an embodiment.

FIG. 5 is a schematic diagram of portable battery pack 100 with a built-in wireless power transmitter and second receiver coil 141 for wirelessly charging portable battery pack 100, according to an embodiment. In this configuration, portable battery pack 100 can be wirelessly charged by, for example, a charge mat. Receiver resonant capacitors 142 ensure maximum power transfer using resonant inductive coupling. In an embodiment, second receiver coil 141 can be used as an antenna for wireless communication when not being used for wireless charging. For example, a switching means can be used that switches the terminals of second receiver coil 144 from rectifier and battery charger 140 to a wireless transceiver (e.g., Bluetooth, NFC, RFID) when operating in a wireless communication mode.

In an embodiment, portable battery pack 100 and portable electronic device 110 each include a battery charger 140. Portable battery pack 100 and portable electronic device 110 communicate by pulsing (turning on and off) their respective battery chargers causing variations in the magnetic field between the devices that can be used to transmit and receive short messages through their respective coils using magnetic communication protocols. By using a pulse-based, magnetic near-field communication protocol, data or messages can be transferred between portable battery pack 100 and portable electronic device 110 when the portable battery pack 100 and portable electronic device are in a mated configuration. The pulse protocol allows the communication of various battery status indicators from portable battery pack 100 to portable electronic device 110, including but not limited to state of charge (SOC), depth of discharge (DOD), charge/discharge rate, temperature, health status, etc.

An example pulse protocol for magnetic near-field communication is described in Jiang, Weiwei et al. Pulse: Low Bitrate Wireless Magnetic Communication for Smartphones. *Proceedings of the* 2014 *ACM International Joint Conference on Pervasive and Ubiquitous Computing,* 2014. The pulse protocol uses a constant period length that is long enough to account for circuit limitations. In an embodiment, 2 bits can be transferred each period using 4-level amplitude shift-keying (ASK) coding. A data packet can include, for example, 8 periods (4 bytes) each. In an embodiment, the data uses ASCII encoding. If the message requires multiple packets, an [x] or other character can be used to indicate an empty period (t0) between two consecutive packets. In an embodiment, the protocol can include packet types, sequence numbers, and cyclic redundancy codes (CRC) to minimize the amount of bits transferred.

In an embodiment, portable electronic device 110 can use a single ASCII number to request data. For example, portable electronic device 110 can begin a communications session by pulsing an [x] character during the first period and then pulsing a single ASCII code representing a number that indicates a specific data request during the second period. For example, the number 0 could be a request for state of charge, the number 1 could be for depth of charge, etc. This reduces the amount of bits needed in a data request. Portable battery pack 100 responds with the requested data (e.g., % of charge remaining) using ASCII codes. In another embodiment, portable battery pack 100 reports battery status data on a scheduled based or a trigger event without requiring a specific request from portable electronic device 110.

In an embodiment, portable battery pack 100 includes a microcontroller, a modulator/demodulator circuit and memory for storing microcontroller instructions and ASCII codes. The microcontroller is coupled to the modulator/demodulator circuit, which is coupled to the battery charger. In a communication mode, the modulator/demodulator circuit can be coupled to the transmitter coil for modulating/demodulating a battery status data. For example, the demodulated pulse protocol can be converted to digital values using an analog-to-digital converter (ADC) and input into the microprocessor, which interprets the codes, generates the ASCII encoding for the battery status, and outputs the ASCII encoding to a digital-to-analog converter (DAC). The output of the DAC is input to the modulator circuit which modulates the voltage applied to the coil using the power amplifier.

In an alternative embodiment, portable battery pack 100 implements a state machine for responding to polling requests for battery status data received from portable electronic device 110, and then using the battery charge circuit to send the battery status data over the magnetic link to portable electronic device 110.

In an embodiment, the communication channel between the portable battery pack and the portable electronic device provides an authentication lock that would render, for example, a stolen portable electronic device useless when unmated from the portable battery pack. That is, the portable electronic device would only be able to mate with an authenticated portable battery pack and vice versa. In an embodiment, the portable electronic device is rendered fully or partially inoperable in response to the mated configuration being broken or a detected unmated condition. In an embodiment, heart beat signals are sent from the portable electronic device to the portable battery pack to indicate the existence of a mated configuration and trigger an action of rendering the portable electronic device fully or partially inoperable when the heart beat signal terminates. In an embodiment, the portable electronic device is rendered fully or partially inoperable after a specified period of time has elapsed. For example, if the configuration is briefly unmated by the user changing the location of the mated devices, then the portable device will remain fully operable until the period of time has elapsed, at which time the device is made fully or partially inoperable. In an embodiment, any authentication protocol can be used to authenticate the devices to each.

Figure 6:
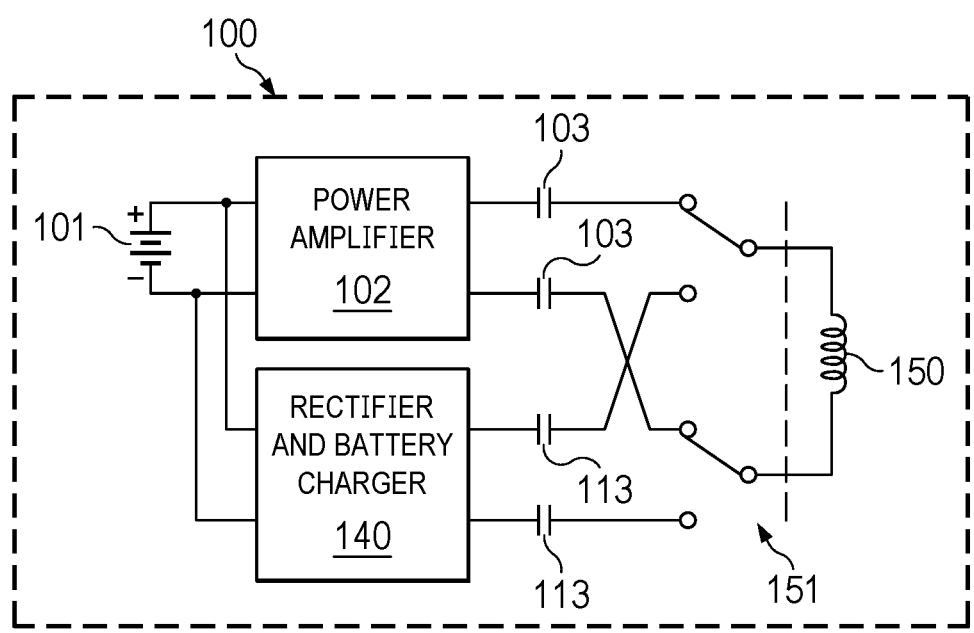
FIG. 6 is a schematic diagram of a portable battery pack with a single coil for powering a portable electronic device and for charging the portable battery pack, according to an embodiment.

FIG. 6 is a schematic diagram of portable battery pack 100 with single coil 150 for powering portable electronic device 110 and for charging portable battery pack 100, according to an embodiment. In this embodiment, switching means 151 is used to connect single coil 150 to power amplifier 102 in an operating mode, or connect single coil 150 to rectifier and battery charger 140 in a charging mode. With the use of single coil 150 for both the charging mode and the operating mode of portable battery pack 100, switching means 151 is used to connect coil 150 to either power amplifier 102 or rectifier and battery charger 140. Switching means 151 shown is a double-pole/double-throw relay. Other switching means are possible, such as solid state switches. Switching means 151 has both low parasitic capacitance between output terminals to achieve isolation in an off state, and low contact resistance to pass a signal in an on state.

Figure 7:
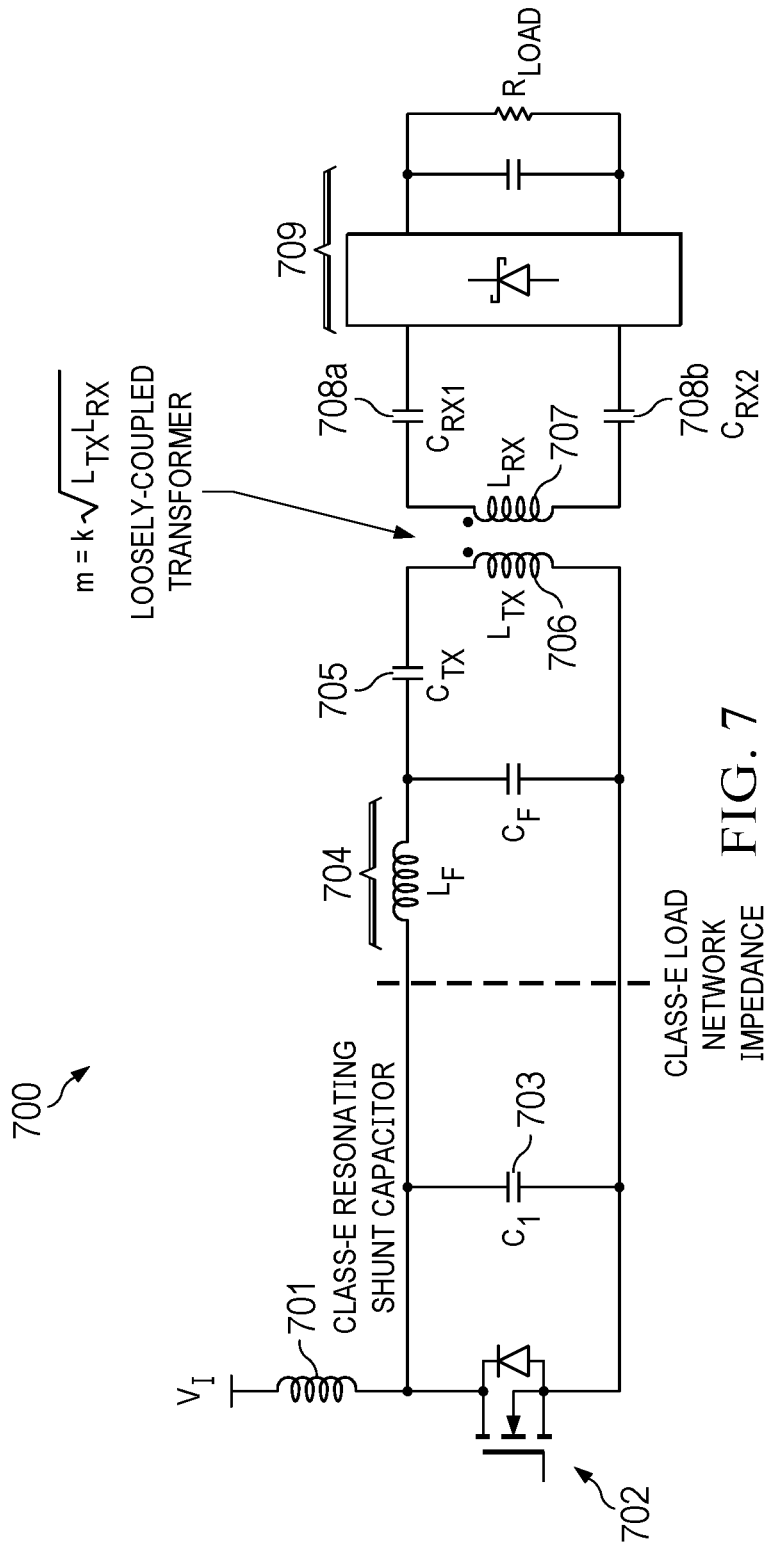
FIG. 7 is a schematic diagram of a single-ended Class E power amplifier for wireless power transfer, according to an embodiment.

FIG. 7 is a schematic diagram of a single-ended Class E power amplifier 700 for wireless power transfer, according to an embodiment. Power amplifier 700 includes DC feed inductor 701, MOSFET switch 702, resonating shunt capacitor 703 (C1), impedance match filter 704 ($L_F$ and $C_F$), transmitter resonant capacitor 705 ($C_{TX}$), transmitter coil 706 ($L_{TX}$), receiver coil 707 ($L_{RX}$), receiver resonant capacitors 708a ($C_{RX1}$) and 708b ($C_{RX2}$), rectifier and filter 709 (e.g., a full-wave (full diode) rectifier coupled in parallel with a filter capacitor for reducing ripple). Transmitter coil 706 and receiver coil 707 form a loosely-coupled transformer.

Figure 8:
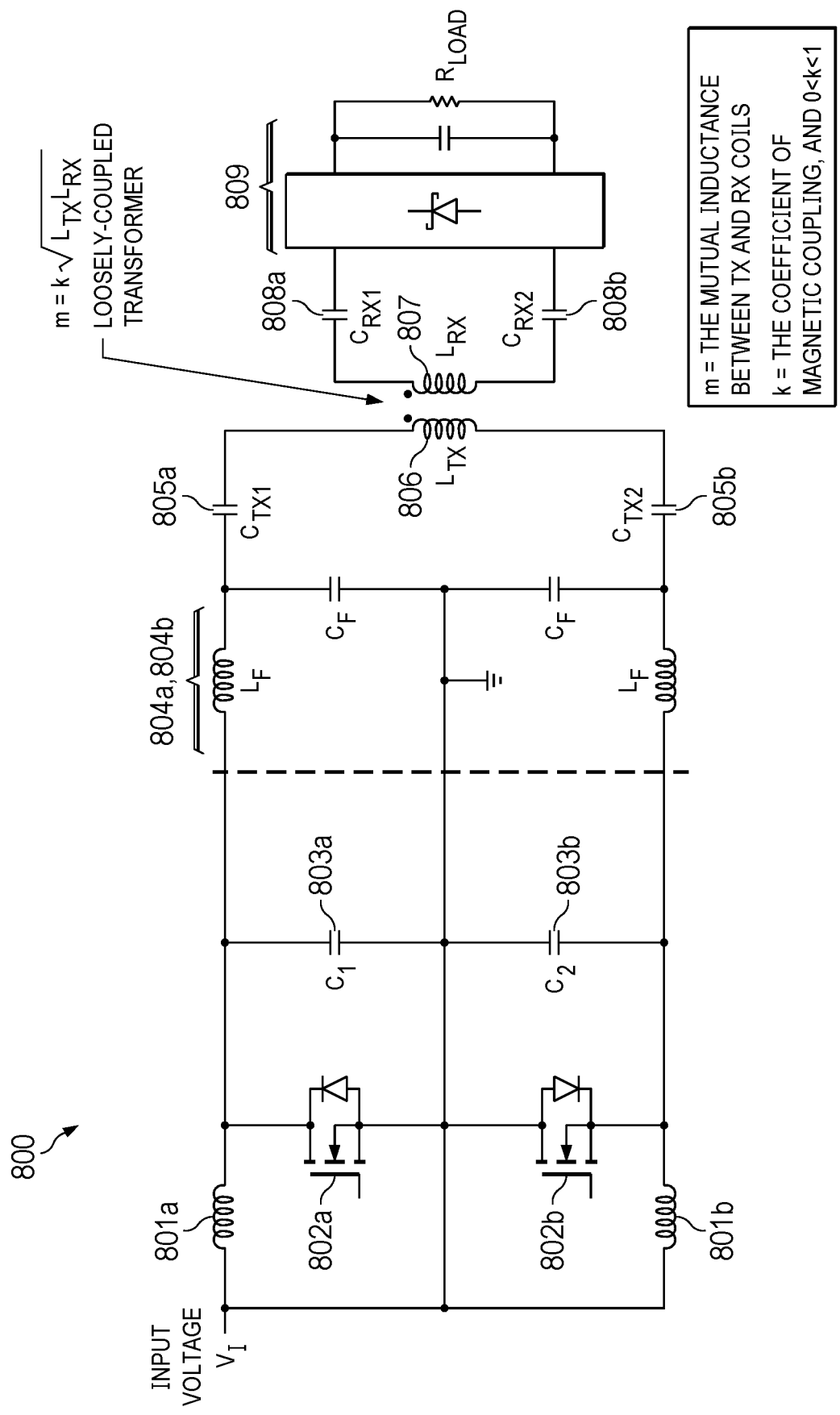
FIG. 8 is a schematic diagram of a push-pull Class-E converter for wireless power transfer, according to an embodiment.

FIG. 8 is a schematic diagram of push-pull Class-E converter 800 for wireless power transfer, according to an embodiment. Converter 800 includes DC feed inductors 801a, 801b, MOSFET switches 802a, 802b, resonating shunt capacitors 803a (C1) and 803b (C2), impedance match filters 804a, 804b (which include inductors LF and capacitors $C_F$), transmitter resonant capacitors 805a ($C_{TX1}$) and 805b ($C_{TX2}$), transmitter coil 806 ($L_{TX}$), receiver coil 807 ($L_{RX}$), resonant capacitors 808a ($C_{RX1}$) and 808b ($C_{RX2}$) and rectifier and filter 809. Transmitter coil 806 and receiver coil 807 form a loosely-coupled transformer.

In the embodiments shown in FIGS. 7 and 8, the Z-match filters include inductor LF and capacitor $C_F$ and are used for impedance matching. In another embodiment the L-C filter is omitted, and in place of the LF filter there is a short circuit and in place of $C_F$ there is an open circuit. Although this embodiment uses a Class-E power amplifier, a Class-D or other power amplifier topology can also be employed. The inductor LF and the capacitor CF form a two-port network that constitutes a low-pass filter, and can be employed for impedance matching in the power amplifier 102.

In an embodiment, the coils are constructed using spiral wound traces (e.g., copper traces) on a PCB, and a shield of ferrite material is used behind the PCB to shape the magnetic field. The loss tangent of the ferrite material should be low at the chosen frequency of operation. In another embodiment, a thin sheet of metal, e.g., copper or aluminum, is placed behind the ferrite shield to further attenuate the magnetic field behind the coil/shield assembly.

In an embodiment, portable battery pack 100 includes additional circuitry needed to comply with at least one of The Alliance for Wireless Power (A4WP), the Power Matters Alliance (PMA) and the Wireless Power Consortium (WPC or "Qi") standards.

FIG. 9 are top and side views of a planar coil disposed on a PCB, according to an embodiment. In this example embodiment, copper traces are spiral wound on PCB. The copper traces are disposed on a low-loss magnetic material which is optionally disposed on a copper or aluminum shield. Any desired number of turns can be used depending on the application and operating constraints.

What is claimed is:

1. A magnetic communication system comprising:
    a portable battery pack including:
        a first housing having a first mating surface;
        a first permanent magnet disposed on the first mating surface, the first permanent magnet coupling the first mating surface to a second mating surface of a portable electronic device;
        a battery cell;
        a first battery charger;
        a first coil coupled to the first battery charger; and
        a first processor coupled to the first battery charger, the first processor configured to command the first battery charger to encode a first magnetic field emitted from the first coil with first data, and to decode second data from a second encoded magnetic field received on the first coil that is emitted from a second coil of the portable electronic device;
    the portable electronic device including:
        a second housing having the second mating surface;
        a second permanent magnet disposed on the second mating surface, the second permanent magnet magnetically coupled to the first permanent magnet disposed on the first mating surface of the portable battery pack;
        a second battery charger coupled to the second coil; and
        a second processor coupled to the second battery charger, the second processor configured to command the second battery charger to encode a second magnetic field emitted from the second coil with the second data, and to decode the first data from the first encoded magnetic field received on the second coil that is emitted from the first coil of the portable battery pack.

2. The magnetic communication system of claim 1, wherein the first battery charger is configured by the first processor to cause variations in the first magnetic field to encode the first data according to a communication protocol.

3. The magnetic communication system of claim 1, wherein the second battery charger is configured by the second processor to cause variations in the second magnetic field to encode the second data according to a communication protocol.

4. The magnetic communication system of claim 2 or 3, wherein the communication protocol is a pulse-based, magnetic near-field communication protocol.

5. The magnetic communication system of claim 1, wherein the first data includes a battery status indicator.

6. The magnetic communication system of claim 1, wherein at least one of the first processor or the second processor is a wireless communication transceiver.

7. The magnetic communication system of claim 1, further comprising:
    a power amplifier included in the first housing and coupled to the battery cell; and
    a switching means included in the first housing, the switching means configured to couple at least one terminal of the first coil to the power amplifier when charging the portable electronic device, and to couple the at least one terminal of the first coil to the first battery charger during a wireless communication with the portable electronic device.

8. The magnetic communication system of claim 1, wherein the first processor implements a state machine for responding to polling requests for battery status from the portable electronic device.

* * * * *